(12) United States Patent
Ichikawa et al.

(10) Patent No.: US 6,769,604 B2
(45) Date of Patent: Aug. 3, 2004

(54) HISTORY MANAGEMENT SYSTEM

(75) Inventors: Yoshiaki Ichikawa, Kanagawa (JP);
Tateo Nakazawa, Kanagawa (JP)

(73) Assignee: NEC Infrontia Corporation,
Kanagawa (JP)

( * ) Notice: Subject to any disclaimer, the term of this patent is extended or adjusted under 35 U.S.C. 154(b) by 0 days.

(21) Appl. No.: 10/440,152

(22) Filed: May 19, 2003

(65) Prior Publication Data

US 2003/0220851 A1 Nov. 27, 2003

(30) Foreign Application Priority Data

May 21, 2002 (JP) ........................................ 2002-145795
Oct. 7, 2002 (JP) ........................................ 2002-293900

(51) Int. Cl.$^7$ ............................................. G06F 17/00
(52) U.S. Cl. ...................... 235/375; 235/485; 235/487; 235/385; 235/383; 705/28
(58) Field of Search ........................... 235/375, 472.01, 235/485, 487, 493, 385, 449, 462.46, 383, 380; 705/28; 340/5.61, 568.8, 568.1, 572, 571, 825.49; 713/200, 201

(56) References Cited

U.S. PATENT DOCUMENTS

| | | | | |
|---|---|---|---|---|
| 5,241,160 A | * | 8/1993 | Bashan et al. | ............... 235/380 |
| 5,469,363 A | * | 11/1995 | Saliga | ........................ 700/225 |
| 5,960,085 A | * | 9/1999 | de la Huerga | ............. 340/5.61 |
| 6,005,482 A | * | 12/1999 | Moran et al. | ............. 340/568.8 |
| 6,168,083 B1 | * | 1/2001 | Berger et al. | ............... 235/492 |
| 6,176,425 B1 | * | 1/2001 | Harrison et al. | ............ 235/385 |
| 6,193,160 B1 | * | 2/2001 | Zembitski | ............... 235/472.01 |
| 6,232,877 B1 | * | 5/2001 | Ashwin | .................... 340/572.1 |
| 6,321,983 B1 | | 11/2001 | Katayanagi et al. | |
| 6,380,597 B1 | * | 4/2002 | Gudesen et al. | ............. 257/390 |
| 6,385,407 B1 | | 5/2002 | Inose | |
| 6,412,693 B1 | * | 7/2002 | Kalinowski | ................. 235/383 |
| 6,422,474 B1 | * | 7/2002 | Gossweiler et al. | ........ 235/492 |
| 6,550,674 B1 | * | 4/2003 | Neumark | ..................... 235/383 |
| 6,608,561 B2 | * | 8/2003 | Lawler et al. | ........... 340/572.8 |
| 2002/0030100 A1 | | 3/2002 | Katayanagi et al. | |

FOREIGN PATENT DOCUMENTS

| | | | | |
|---|---|---|---|---|
| JP | 2000-048066 A | | 2/2000 | |
| JP | 2000-246921 A | | 9/2000 | |
| JP | 2000-285170 A | | 10/2000 | |
| JP | 2001-225915 A | | 8/2001 | |
| JP | 2002193448 | * | 7/2002 | ........... G06F/17/60 |

* cited by examiner

Primary Examiner—Thien M. Le
Assistant Examiner—Edwyn Labaze
(74) Attorney, Agent, or Firm—Foley & Lardner LLP

(57) ABSTRACT

A history management system that enables the user to acquire, via a network, history information even on a passive part like a cable for example, that is part of a product. Firstly, a product is installed with a noncontact label reader/writer which is made capable of connecting to network. Noncontact labels are applied to each part comprising product. These noncontact labels each provide an IC chip and antenna embedded inside the substrate. The IC chip provides a storage part that records information and transfers information to and receives from the noncontact label reader/writer through the antenna by wireless transmission.

3 Claims, 3 Drawing Sheets

HISTORY MANAGEMENT SYSTEM

BACKGROUND OF THE INVENTION

1. Field of the Invention

The present invention concerns a history management system for managing, via a network, the history of parts comprising a product installed at the location of a customer.

2. Description of Related Art

There are history management systems that are used for managing the history of a product, like computer equipment sold to a customer for example, using a network like the internet. These systems can be used to provide things like maintenance services. Such systems are premised on the product being managed having a network connection part that enables it to be connected to a network. Such a product could include for example, computer equipment connected to a network. Information acquired via a network on parts comprising computer equipment sold to a customer can be used when maintenance services are performed.

The applicant has searched prior art documents relating to this invention and found as follows, JP2000-048066A,
JP2000-246921A,
JP2000-285170A, and
JP2001-225915A.

However, a history management system of the prior art, managing for example computer equipment, performs its history management only in respect of those parts comprising the computer that are capable of being recognized by an operating system, in other words only those parts recognized by a CPU (central processing unit), and those parts that cannot be recognized by the CPU cannot be subject to history management performed using a network. For example, parts like a hard disk or flexible disk drive are connected to the main board where the CPU or control chip for example is located, using a prescribed cable, but history management systems of the prior art are not capable of performing history management for this cable. In other words, a problem affecting history management systems of the prior art is that they are incapable of managing the history of a passive part, such as a cable for example.

SUMMARY OF THE INVENTION

The present invention aims to solve the above problem. It's object is to provide a history management system capable of ascertaining, via a network, the history of a passive part comprising a product, such as a cable.

A history management system according to the present invention comprises a noncontact label applied to each part comprising a product which label has a storage part that transfers data to and receives from an external entity through wireless transmission and a noncontact label reader that connects to a prescribed network in the product, that through wireless transmission reads-out part information stored in the storage part of the noncontact label, and operates such that the storage part of the noncontact label stores part information comprised of information concerning the part to which the noncontact label of that storage part is applied and in response to a transmission request for part information received via the network, that noncontact label reader reads, through wireless transmission, the part information stored in the storage part and outputs that part information to the source that issued the transmission request.

According to this invention the part information stored in the storage part of the noncontact label installed for the part can be acquired via a network.

Another embodiment of a history management system according to the present invention comprises a noncontact label applied to each part comprising a product which label has a storage part that transfers data to and receives from an external entity through wireless transmission and a noncontact label reader that connects to a prescribed network in the product, that through wireless transmission reads-out part information stored in the storage part of the noncontact label and a maintenance server connected to the network, and operates such that the storage part of the noncontact label stores part information comprised of information concerning the part to which the noncontact label of that storage part is applied and the noncontact label reader receives via the network, a transmission request for part information output from the maintenance server, reads out through wireless transmission, part information stored in the storage part of the noncontact label and transmits the part information thus read out to the maintenance server via the network.

According to this invention the part information stored in the storage part of the noncontact label installed for the part can be accessed at the connected maintenance server via a network.

Parts for the above history management system, are a CPU, liquid crystal display part, a prepaid card reader/writer, a flexible drive device, a thermal printer, a hard disk device, power supply unit, cache drawer part and an extension board and the information provided by these parts is read in by the noncontact label reader via the CPU and stored in each noncontact label.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

An embodiment of this invention will now be described with reference to the drawings.

Figure 1:
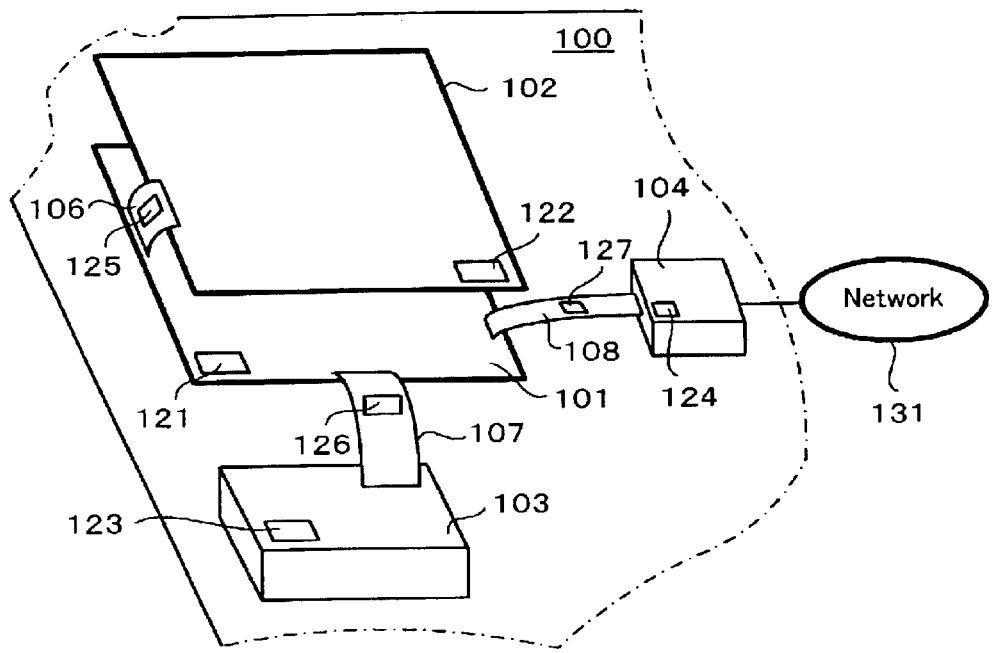
FIG. 1 is a perspective view, showing in outline an example of the configuration of product 100 that forms one part of a history management system according to an embodiment of the present invention.

FIG. 1 is a perspective view, showing in outline an example of the configuration of product 100 that forms one part of a history management system according to an embodiment of the present invention. Product 100 is in this example a computer comprising as its parts, main board 101, sub board 102 and hard disk 103.

For this embodiment, firstly noncontact reader/writer 104 is installed for this product 100. Reader/writer 104 is connected to network 131 and a noncontact label as shown in FIG. 2 is applied to each part.

Figure 2:
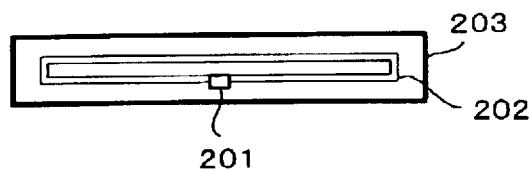
FIG. 2 shows an example of the configuration of a noncontact label.

As shown in FIG. 2, such a noncontact label comprises IC chip 201 and antenna 202 which are embedded in substrate member 203. IC chip 201 comprises a recording part that records information and transfers information to and receives from reader/writer 104 by wireless transmission through antenna 202. IC chip 201 can communicate over a distance of a maximum of 1.5 m, it reads out information stored at a speed of 4 ms/word and writes information at a speed of 9 ms/word.

The external dimensions of substrate member 203 of the noncontact label are 60 mm long, 10 mm wide and 0.25 mm thick. Such a noncontact label need not comprise a substrate member however and could for example be realized through applying an IC chip and antenna directly to the part concerned.

In FIG. 1, main board 101 and sub board 102 are connected by cable 106, hard disk 103 is connected to main board 101 by cable 107 and noncontact label reader/writer 104 is connected to main board 101 by cable 108.

Noncontact label 121 is applied to main board 101. Noncontact label 122 is applied to sub board 102. Noncontact label 123 is applied to a hard disk 103. Noncontact label 124 is applied to noncontact table reader/writer 104. Noncontact label 125 is applied to cable 106. Noncontact label 126 is applied to cable 107. Noncontact label 127 is applied to cable 108.

Figure 3:
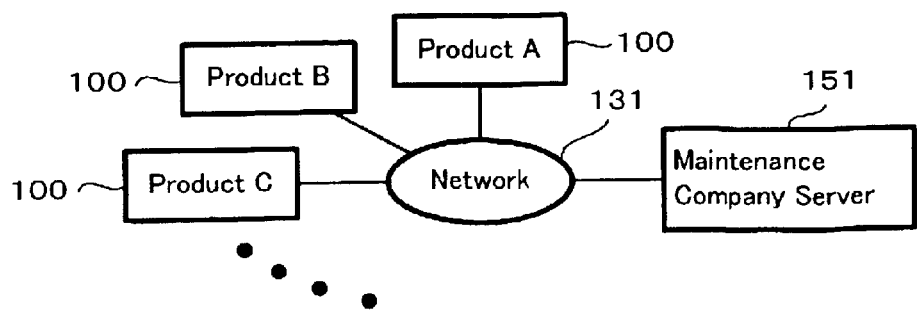
FIG. 3 shows an outline of a history management system according to an embodiment of the present invention.

Referring to FIG. 3, with this embodiment according to the present invention, noncontact label reader/writer 104 (not shown in that drawing) for product A 100, product B 100 and product C 100 connects to maintenance company server ("maintenance server") 151 via network 131. So for example, this maintenance company server 151 connects to noncontact label reader/writer 104 of product A 100 via network 131 and can read out information stored in noncontact label 124 that transmits wirelessly with reader/writer 104.

Figure 4:
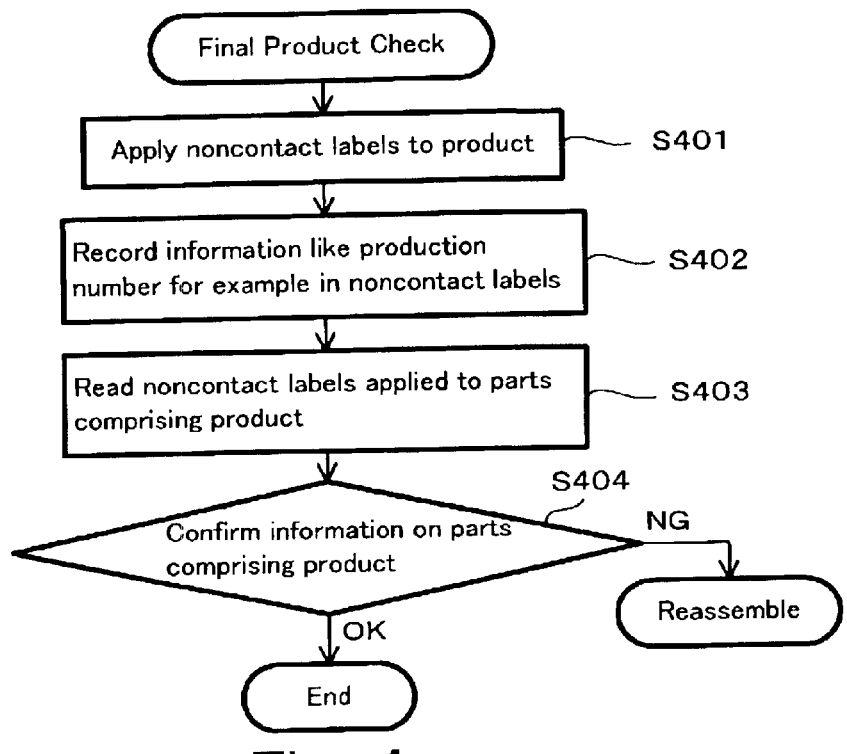
FIG. 4 is a flowchart illustrating application of a noncontact label for a part.

The application of a noncontact label to a part will now be described. As shown in FIG. 4, as the product is manufactured a noncontact label is applied to each part thereof (step S 401). Part information, such as a production number for example for the part with the noncontact label thus applied, is recorded (step S 402). The information recorded in each noncontact label applied is read out (step S 403). Confirmation is made that none of the parts comprising the product are missing (step S 404) and then a final confirmation is made. In this way, each part installed in product 100 has a noncontact label recording information about the part—the part information. The product is also provided with noncontact label reader/writer 104 that reads out the information stored in those noncontact labels. Product 100 is sold in this condition.

The information on a part recorded in its noncontact label has for example a table size of 600 bits consisting of items as shown in the following table, Table 1. The part information shown in that table shows an example of the information that could be recorded in noncontact label 123 applied to hard disk 103.

TABLE 1

| Byte No. | Function |
|---|---|
| 0 | Part name |
| 1 | Name of manufacturer |
| 2 | Revision |
| 3 | Lot number or production number |
| 4 | Country where produced |
| 5 | (Reserved) |
| 6 | (Reserved) |
| 7 | Time power supply turned on |
| 8 | No. of times power supply turned on/off |
| 9 | Temperature |
| 10 | Read error rate |
| 11 | Time spindle motor started |
| 12 | No. of times spindle motor started |
| 13 | Seek error rate |
| 14 | Write error rate |
| 15 | (Reserved) |
| 16 | (Reserved) |
| 17 | No. of times repaired |
| 18 | Time repaired |
| 19 | Repair details |
| 20 | Name of person in charge of repairs |
| 21–59 | As above |
| 60–74 | (Reserved) |

In the above Table 1, Byte Nos. 1 through 4 are for example information necessary to indicate the name of the part to which this noncontact label is applied, the name of the manufacturer of the part, revision and lot number and the country where it was produced. Byte Nos. 7 through 14 comprise recorded information as selected, including for example RAS (Reliability, Availability, Serviceability) information on hard disk 103 obtained by reader/writer 124 via cable 108 from a control circuit part consisting of a CPU for example (not shown in the drawings), installed above main board 101.

Byte No. 17 records the number of times that the part has been repaired. Byte No. 18 records the time at which the repairs were performed. Byte No. 19 records details of the repairs performed. Byte No. 20 records information about the person in charge of performing repairs. Those 4 byte numbers contain information recorded after repairs are performed when trouble arises in the part. Byte Nos. 21 through 59 provide space for recording the same kind of information as described above with respect to Byte Nos. 17 through 20 for repairs made from the second time onwards. The reserved areas shown in Table 1 provide spare space not presently being used, for recording information.

The above described information is recorded as the part information for each part in the storage part of the IC chip of each noncontact label applied to each part, such as main board 101, sub board 102 or cable 106 as well. Thus, information recorded in the storage part inside the IC chip of noncontact label 125 applied to cable 106 for example, includes information showing the part name of the cable, the name of the manufacturer of the cable, the production number and country of production and information indicating the history of replacement of cable 106.

The operations of a history management system according to an embodiment of the present invention of the above described configuration will now be described with reference to FIG. 5.

When a request for repairs on product 100 is received from the customer who has product 100 the person in charge at the maintenance company receiving the repairs request operates maintenance company server 151 and transmits a connection request to noncontact label reader/writer 104 of product 100 via network 131 (step S 501). As maintenance company server 151 is connected to reader/writer 104 through this connection request, a response indicating that connection has been made is returned from reader/writer 104 to server 151 (step S 502).

Receiving this response, maintenance company server 151 requests transmission of information from noncontact label reader/writer 104 (step S 503). Upon receiving this information transmission request reader/writer 104 reads out part information recorded by noncontact labels 121 through 127 applied to each of the parts in product 100 (step S 504), and transmits the part information for each part thus read out to server 151 (step S 505).

The part information transmitted from noncontact label reader/writer 104 is received by maintenance server 151 (step S 506), where it is processed into a condition in which it can be displayed before being displayed on the display part of server 151 (not shown in the drawing) (step S 507). The person in charge at the maintenance company now confirms the information displayed on the display part, thereby obtaining information concerning a part of product 100 from which a repairs request has been received.

For example, information displayed on the display part in the case of hard disk 103 that is one of the parts comprising product 100, is information recorded concerning that hard disk in noncontact label 123 applied to it. For example, in addition to the above mentioned information of part name, the name of the manufacturer and the production number being included in noncontact label 123, there is also RAS information for hard disk 103 such as the time the power supply was turned on, the number of times the power supply was turned on and off, past peak temperature, the read error rate, the time the spindle motor started, the number of times the spindle motor started, the seek error rate and the write error rate as well as repair records included in label 123 and all of this information is displayed on the display part.

In this way, according to this embodiment of the invention, the condition of the product sold to the customer can be confirmed in real-time without a person actually going to the customer.

Figure 6:
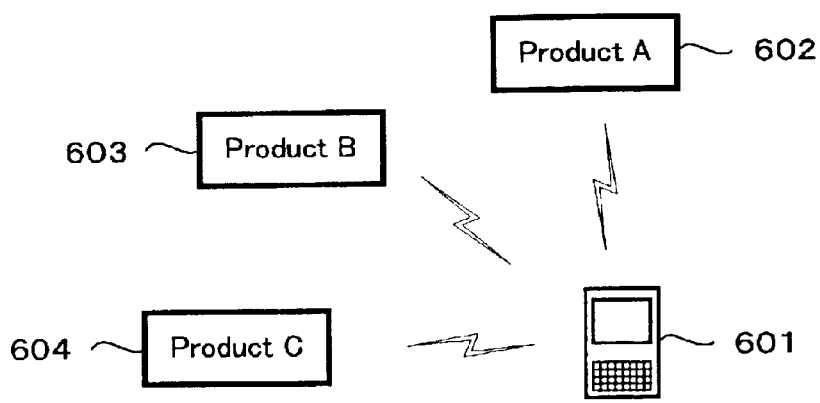
FIG. 6 shows an outline of a history management system according to another embodiment of the present invention.

The above description describes how the present invention enables the condition of a customer's product to be confirmed by a maintenance company, however that description is not intended to limit the application of this invention. For example, as shown in FIG. 6 a maintenance staff dispatched from a maintenance company can take a mobile noncontact label reader/writer 601 which can be used to read out information recorded in the noncontact labels applied to the parts comprising products 602 through 604 where those products are installed.

By doing this, even at times when the power is not turned on to the product installed at the customer's location or at times when due to a breakdown for example, it is not possible to read out information from a noncontact label through the noncontact label reader/writer installed, it is still possible to read out information recorded in a noncontact label applied to a part. Further, there may be times when even though information can be read out from a noncontact label through the noncontact label reader/writer installed in the product, it is still not possible to establish a connection via a network. Even in this situation however it is still possible in accordance with the above description, to read out information recorded in a noncontact label applied to a part of a product.

Figure 7:
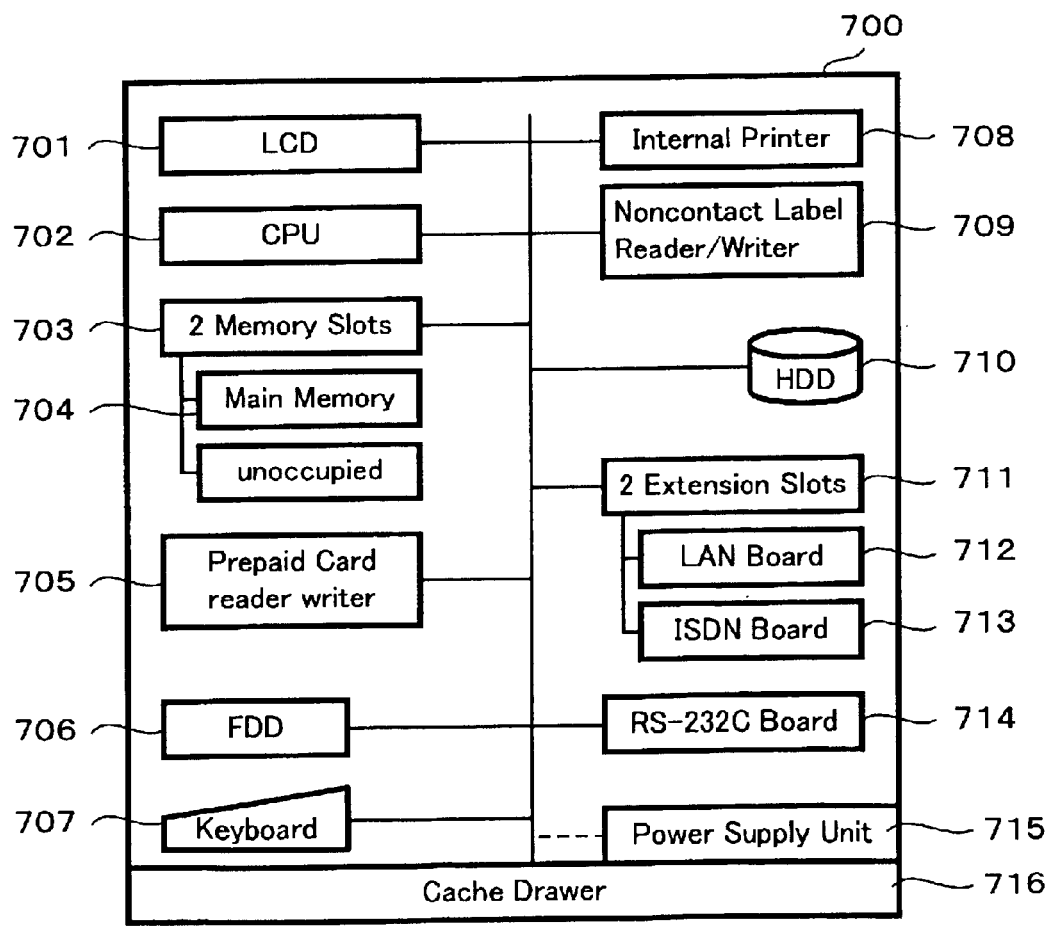
FIG. 7 is a perspective view, showing in outline an example of the configuration of product 700 that forms one part of a history management system according to another embodiment of the present invention.

FIG. 7 is a perspective view, showing in outline an example of the configuration of product 700 that forms one part of a history management system according to another embodiment of the present invention. Product 700 could be for example a POS (point of sales) register. This POS register is provided with noncontact label reader/writer 709 and comprises as its parts LCD (liquid crystal display) 701, CPU 702, memory slot 703, main memory 704 loaded in memory slot 703, prepaid card reader writer 705, FDD (flexible disk drive) 706, keyboard 707, installed printer 708 like a thermal printer for example, HDD (hard disk drive) 710, extension slot 711, an extension board like LAN board 712 or ISDN (Integrated Services Digital Network) board 713 loaded in extension slot 711, RS-232C board 714, power supply unit 715 and cache drawer part 716. Although not shown in the drawing, a noncontact label is applied to each of these parts.

Product 700 is a computer performing centralized control over each part as for example CPU 702 operates from a program recorded in HDD 710 that is loaded in a specified region of main memory 704. Further, this product 700 that is a POS register has for example ISDN board 713 connected to a public line network facilitating connection via that network to a collection center (not shown in the drawings), so that product 700 can perform transference of information like sales information or the sales price collected and stored in HDD 710.

Parts such as LCD 701, prepaid card reader writer 705, FDD 706, keyboard 707, thermal printer 708, HDD 710, power supply unit 715 and cache drawer 716 of product 700 have a part information recording part that provides the part information for each part, information on its operations and RAS information. For example, the part information recording part of HDD 710 records information like that shown in Table 1 above.

Noncontact label reader/writer 709 regularly acquires the information in the part information recording part of each part via CPU 702 for example and records that information in the respective noncontact labels applied to each part. Thus, as the part information recording part of each respective part has consecutively recorded information on the existing state, like the operational conditions for example, of each part, the information recorded in each noncontact label is being regularly updated with the latest information.

History management for product 700 of FIG. 7 of the above described configuration is the same as for the previously described embodiment. For example, product C 100 shown in FIG. 3 is equivalent to product 700 shown in FIG. 7. Here, noncontact label reader/writer 709 for product 700 is connected to maintenance company server 151 via network 131. Network 131 is for example, a public line network connected to ISDN board 713.

Figure 5:
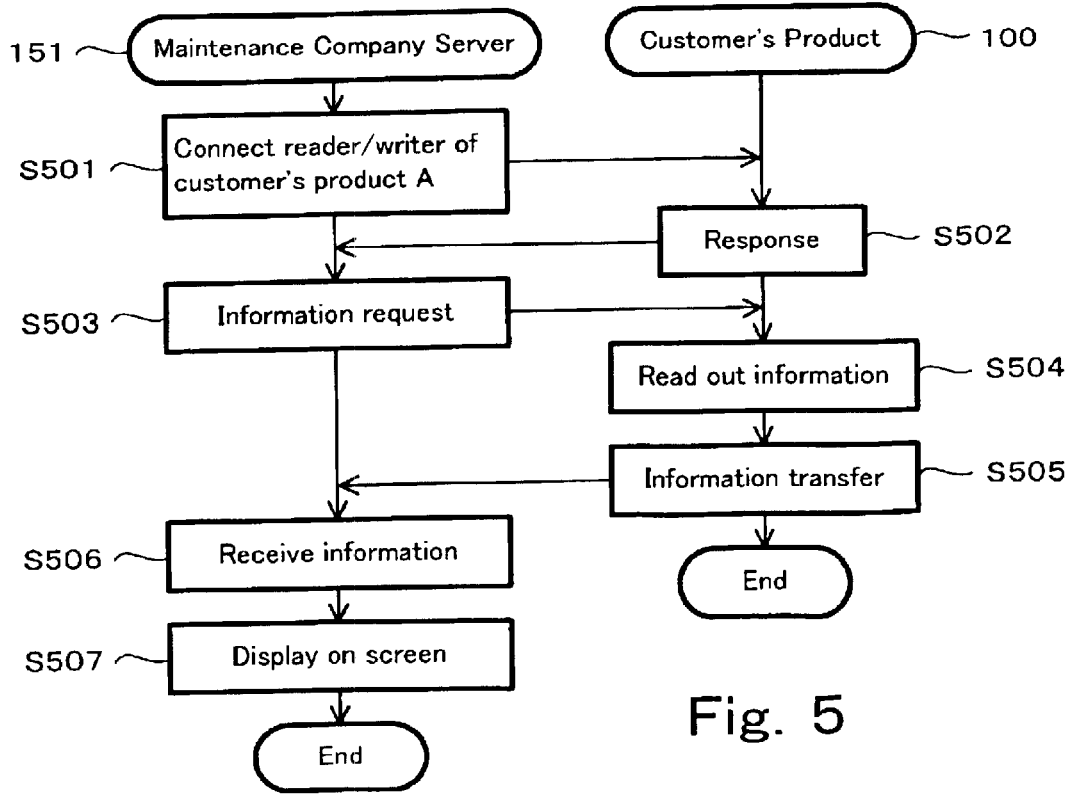
FIG. 5 is a flowchart illustrating the operations of a history management system according to an embodiment of the present invention.

With a system configured like this, as a request for repairs on product 700 is received from the customer who has product 700, the person in charge at the maintenance company receiving the repairs request operates maintenance company server 151 and transmits a connection request to noncontact label reader/writer 709 of product 700 via network 131 (step S 501 of FIG. 5). As maintenance company server 151 is connected to reader/writer 709 through this connection request, a response indicating that connection has been made is returned from reader/writer 709 to server 151 (step S 502).

Receiving this response, maintenance company server 151 requests transmission of information from noncontact label reader/writer 709 (step S 503). Upon receiving this information transmission request reader/writer 709 reads out part information recorded by noncontact labels applied to each of the parts in product 700 (step S 504), and transmits the part information for each part thus read out to server 151 (step S 505).

The part information transmitted from noncontact label reader/writer 709 is received by maintenance server 151 (step S 506), where it is processed into a condition in which it can be displayed before being displayed on the display part of server 151 (not shown in the drawing) (step S 507). The person in charge at the maintenance company now confirms the information displayed on the display part, thereby obtaining information concerning a part of product 700 from which a repairs request has been received.

As described, this invention provides a system wherein part information stored in a noncontact label applied to a part can be acquired via a network. Accordingly, an excellent effect realized by this invention is that even in the case of a passive part such as a cable for example, that comprises part of a product, if such a noncontact label is applied to that cable it becomes possible to acquire information on the history of that cable via a network.

What is claimed is:

1. A history management system comprising:
   a) at least one first noncontact label applied to a wire connector which electronically interconnects a first and second part of a product;
   b) said at least one first noncontact label having a storage area for storing wire information;
   c) at least one second noncontact label applied to a given part of said product;
   d) said at least one second noncontact label having a storage area for storing part information;
   e) a noncontact label reader operative for wirelessly reading out said wire information and said part information from said at least one first noncontact label and said at least one second noncontact label respectively;
   f) said label reader connected to a network external to said product, and responsive to a transmission request received from said external network, for transmitting to said external network said wire information and said part information.

2. The history management system according to claim 1
   wherein said at least one given part comprises a CPU, liquid crystal display part, a prepaid card reader/writer, a flexible drive device, a thermal printer, a hard disk device, power supply unit, cache drawer part and an extension board and
   wherein the information provided by said attached one given part is read in by said at least one second noncontact label reader via said CPU and stored in each said storage area of said at least one second noncontact label.

3. The history management system as recited in claim 1 further comprising
   a maintenance server connected to said external network, and
   wherein said noncontact label reader receives via said network, said transmission request from said maintenance server.

* * * * *